US 8,305,938 B2

(12) United States Patent
Holness et al.

(10) Patent No.: US 8,305,938 B2
(45) Date of Patent: Nov. 6, 2012

(54) INTERWORKING AN ETHERNET RING NETWORK WITH A SPANNING TREE CONTROLLED ETHERNET NETWORK

(75) Inventors: Marc Holness, Ottawa (CA); Abdullah Bashar, Ottawa (CA)

(73) Assignee: Ciena Corporation, Hanover, MD (US)

( * ) Notice: Subject to any disclaimer, the term of this patent is extended or adjusted under 35 U.S.C. 154(b) by 26 days.

(21) Appl. No.: 12/344,355

(22) Filed: Dec. 26, 2008

(65) Prior Publication Data

US 2009/0168671 A1 Jul. 2, 2009

Related U.S. Application Data

(60) Provisional application No. 61/009,629, filed on Dec. 31, 2007.

(51) Int. Cl.
*G01R 31/08* (2006.01)
(52) U.S. Cl. ......... 370/256; 370/255; 370/257; 370/258
(58) Field of Classification Search .................. 370/401, 370/402, 469, 241, 340, 327
See application file for complete search history.

(56) References Cited

U.S. PATENT DOCUMENTS

| | | | | |
|---|---|---|---|---|
| 6,519,231 | B1 * | 2/2003 | Ding et al. | 370/256 |
| 7,606,229 | B1 * | 10/2009 | Foschiano et al. | 370/392 |
| 2005/0201409 | A1 * | 9/2005 | Griswold et al. | 370/445 |
| 2005/0207348 | A1 * | 9/2005 | Tsurumi et al. | 370/241 |
| 2007/0076719 | A1 * | 4/2007 | Allan et al. | 370/392 |
| 2008/0095047 | A1 * | 4/2008 | Skalecki et al. | 370/225 |
| 2009/0059800 | A1 * | 3/2009 | Mohan | 370/241.1 |
| 2009/0073989 | A1 * | 3/2009 | Cai et al. | 370/395.53 |
| 2009/0168671 | A1 * | 7/2009 | Holness et al. | 370/256 |

FOREIGN PATENT DOCUMENTS

CA 2566005 11/2004

OTHER PUBLICATIONS

International Search Report from corresponding PCT application PCT/CA2008/002300.
G. Chirovolu, et al., "Issues and Approaches on Extending Ethernet Beyond LANs", IEEE Communicaitons Magazine, Mar. 2004, pp. 80-86.
M. Lasserre et al., "Virtual Private LAN Service (VPLS) Using Label Distribution Protocol (LDP) Signaling" (RFC 4762), Jan. 2007, pp. 1-31.

(Continued)

*Primary Examiner* — Hassan Phillips
*Assistant Examiner* — Anez Ebrahim
(74) *Attorney, Agent, or Firm* — Clements Bernard PLLC; Christopher L. Bernard; Lawrence A. Baratta, Jr.

(57) ABSTRACT

To enable an Ethernet ring to be dual homed into a spanning tree protocol controlled Ethernet network, spanning tree control packets (Bridged Protocol Data Units or BPDUs) are transported as data frames over the Ethernet ring. This allows the Ethernet ring to appear as a single link to the spanning tree protocol so that the spanning tree can extend over the link. However, since the spanning tree does not have visibility as to the internal structure of the ring, the spanning tree cannot block links on the Ethernet ring network. Conversely, BPDUs from the Ethernet ring are not transmitted into the Ethernet domain that is implementing the spanning tree, so that the spanning tree is not affected by the control mechanism in place on the Ethernet ring network.

12 Claims, 3 Drawing Sheets

OTHER PUBLICATIONS

Applicants hereby notify the Examiner of related U.S. Appl. No. 12/344,362 which is referenced in paragraph 2 of the instant application.

International Search Report from corresponding PCT application PCT/CA2008/002301 which corresponds to related U.S. Appl. No. 12/344,362.

* cited by examiner

INTERWORKING AN ETHERNET RING NETWORK WITH A SPANNING TREE CONTROLLED ETHERNET NETWORK

CROSS-REFERENCE TO RELATED APPLICATIONS

This application claims priority to U.S. Provisional Patent Application No. 61/009,629, filed Dec. 31, 2007, entitled Interworking An Ethernet Ring Network With a Spanning Tree Controlled Ethernet Network, the content of which is hereby incorporated herein by reference.

This application is related to U.S. patent application Ser. No. 12/027,942, entitled Method And Apparatus For Controlling A Set Of Ethernet Nodes Interconnected To Form One Or More Closed Loops, filed Feb. 7, 2008, the content of which is hereby incorporated herein by reference. This application is also related to U.S. patent application Ser. No. 12/344,362 entitled Interworking An Ethernet Ring Network With a an Ethernet Network with Traffic Engineered Paths filed on even date herewith, which claims priority to U.S. Provisional Patent Application No. 61/009,720, filed Dec. 31, 2007, entitled Interworking An Ethernet Ring Network With an Ethernet Network with Traffic Engineered Trunks, the content of which is hereby incorporated herein by reference.

TECHNICAL FIELD

The present invention relates to Ethernet networks and, more particularly, to a method and apparatus for interworking an Ethernet ring network with a spanning tree controlled Ethernet network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information associated with routing information should be exchanged between the network elements.

Ethernet is a well known networking protocol that has been defined by the Institute of Electrical and Electronics Engineers (IEEE) as standards 802.1 and 802.3. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

FIG. 1 shows several fields that have been added to the Ethernet standard over time. As shown in FIG. 1, the original Ethernet frame format specified by IEEE 802.1 includes a source address (C-SA) and a destination address (C-DA). IEEE 802.1Q added a Customer VLAN tag (C-Tag) which includes an Ethertype, Tag Control Information (TCI) information, and customer VLAN ID. IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame. These tags also allow the customer and subscriber to specify other aspects which are not relevant to an understanding of the contribution disclosed herein. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of the customer MAC addresses (C-SA and C-DA) and the I-SID are commonly referred to as the I-Tag. A domain implemented using this Ethernet standard will be referred to as a Provider Backbone Bridging (PBB) domain.

802.1Q, 802.1ad, and 802.1ah all use one or more spanning tree instances in the control plane to determine which links should be active and which should be blocked to prevent the formation of loops. An Ethernet network domain that implements one or more spanning trees on the control plane will be referred to herein as a spanning tree controlled Ethernet network domain.

Since a spanning tree requires all data to flow on particular selected links on the network, the network links that are part of the spanning tree may experience congestion. IEEE 802.1Qay was developed to allow traffic engineered paths to be defined on the network so that traffic could be forwarded over links not forming part of the spanning tree. IEEE 802.1Qay specifies a way for network elements on an Ethernet network domain to switch traffic based on the B-DA and B-VID rather than just forwarding the traffic according to the B-DA. The header of the frames forwarded on an Ethernet network established using this technology is not changed, but the manner in which the header information is used is changed, to allow forwarding to take place in a different manner. A network domain that forwards traffic using this forwarding paradigm will be referred to as Provider Backbone Trunking (PBT) network. PBT networks allow traffic engineered paths (trunks) to be established so that traffic can follow specified paths through the network rather than being required to follow the links that have been selected to be part of the spanning tree. The spanning tree is still used to forward control frames, however.

Network nodes may be logically or physically arranged many different ways. One common way to arrange or interconnect network elements is to interconnect them in a ring, for example as shown in FIG. 2. In the example shown in FIG. 2, the ring 20 includes nodes 12, which are interconnected by links 14. In the example shown in FIG. 2, each node has a pair of 802.3 MAC interfaces 16 and an 802.1 bridge relay 18. 802.3 is another protocol established by the IEEE to define the Ethernet link layer. A control entity 20 is used to allow the network elements to exchange routing information and other control information, and is used by the network element to control how the data plane handles the data on the network. For example, the control entity enables the node to participate in the spanning tree.

Ethernet Shared Protection Rings (E-SPRING) is a protocol designed to be used in Ethernet rings such as the ring of FIG. 2, and is defined as ITU-T SG15/Q9, G.8032. This protocol specifies how the nodes on the ring should handle unicast, multicast, and broadcast frames. It also specifies multiple service classes, failure handling, and other aspects of how traffic should be forwarded by nodes on the Ethernet ring. The manner in which an Ethernet ring operates is described in greater detail in U.S. patent application Ser. No. 12/027,942, entitled Method And Apparatus For Controlling A Set Of Ethernet Nodes Interconnected To Form One Or More Closed Loops, filed Feb. 7, 2008, the content of which is hereby incorporated herein by reference.

Ethernet rings are able to interconnect with an Ethernet network running a spanning tree or implementing traffic engineered paths if the networks are interconnected at a single node. Unfortunately, having the two networks interconnected at a single node creates a single point of failure since, if the node goes down, interconnectivity between the networks will be lost. Thus, it would be advantageous to allow the two networks to be connected by two or more nodes. However, since the two networks are running two different control planes (E-SPRING control plane in ring, and spanning tree in the other Ethernet network) it is necessary to allow the nodes on the ring to know which of the nodes bridging between the two networks (or whether both of the nodes) are on the spanning tree. At the same time, the spanning tree should be allowed to extend over the ring network without affecting the operation of the ring network.

SUMMARY

To enable an Ethernet ring to be dual homed into a spanning tree protocol controlled Ethernet network, spanning tree control packets (Bridged Protocol Data Units or BPDUs) are transported as data frames over the Ethernet ring. This allows the Ethernet ring to appear as a single link to the spanning tree protocol so that the spanning tree can extend over the link. However, since the spanning tree does not have visibility as to the internal structure of the ring, the spanning tree cannot block links on the Ethernet ring network. Conversely, BPDUs from the Ethernet ring are not transmitted into the Ethernet domain that is implementing the spanning tree, so that the spanning tree is not affected by the control mechanism in place on the Ethernet ring network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Network elements arranged in a closed loop network topology will be referred to herein as Ethernet Shared Protection Ring (E-SPRing) nodes. The control protocol used to control operation of the nodes on the closed loop will be referred to as E-SPRing.

Figure 1:
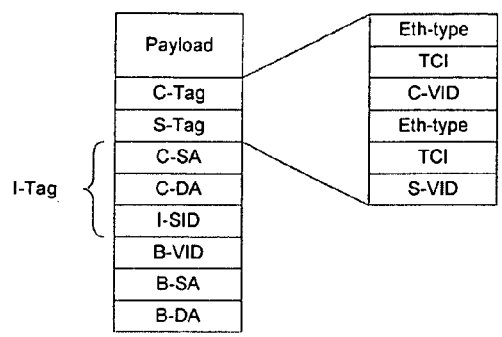
FIG. 1 is a functional block diagram of an Ethernet frame format.
Figure 2:
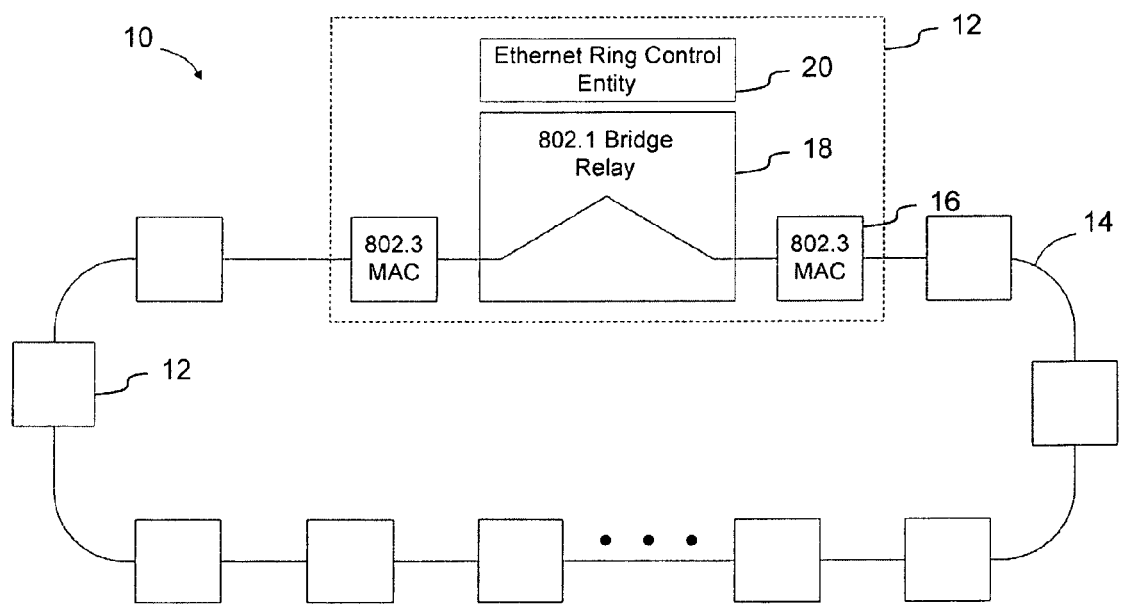
FIG. 2 is a functional block diagram of an example Ethernet ring network.

Closed loops such as the loop shown in FIG. 2 may exist in isolation or may exist as a logical ring within a larger mesh network. The techniques described herein may be used wherever a set of Ethernet nodes is interconnected logically or physically to construct a closed loop network topology. For example, in a communication network having a mesh configuration, it is possible to form a logical ring by selecting nodes 12 from the mesh that interconnect to form a closed loop network topology. An Ethernet Shared Protection Ring (E-SPRing) control instance may be run on any such logical or physical ring. Additionally, multiple control instances may be run on the same physical ring to form multiple ringlets on the physical/logical closed loop.

Implementation E-SPRing control protocol is described in greater detail in U.S. patent application Ser. No. 12/027,942, filed Feb. 7, 2008, the content of which is hereby incorporated by reference. Briefly, as described in greater detail therein, when Ethernet nodes that are interconnected in a closed loop architecture, the nodes may be allowed to collectively run a separate control plane to control how data is passed between the nodes on the ring. The control plane on the closed loop selects one of the nodes to be a root node to provide for blocking of traffic flowing on the ring. This prevents traffic from endlessly looping on the ring. Additionally, the control plane provides for failure detection on the closed loop, notification of the failure to the nodes on the closed loop, and how connectivity can be restored to enable the closed loop to recover from failure. One aspect of the control protocol is that, upon failure in the closed loop, a fault indication message will be transmitted on the ring. The fault indication message, amongst other things, causes the bridging nodes on the ring to flush their forwarding databases associated with the ring, so that the nodes can re-learn MAC addresses on the ring.

Where a network implementing a spanning tree and a closed loop network are connected with each other, each network will continue to implement its own control plane. Since the control plane of the network specifies how particular addresses are reachable on the network, where the two networks are connected at more than one place, the changes in one network may affect forwarding on the other connected network.

IEEE 802.1Q, IEEE 802.1ad (Provider Bridging), and IEEE 802.1ah (Provider Backbone Bridging) solutions rely on spanning tree protocol for service restoration. An Ethernet network that uses a spanning tree in the control plane will be referred to herein as a spanning tree protocol controlled Ethernet network. To enable an Ethernet ring to be dual homed into a spanning tree protocol controlled Ethernet network, spanning tree control packets (Bridged Protocol Data Units or BPDUs) are transported as data frames over the Ethernet ring. This allows the Ethernet ring to appear as a single link to the spanning tree protocol so that the spanning tree can extend over the link. However, since the spanning tree does not have visibility as to the internal structure of the ring, the spanning tree cannot block links on the Ethernet ring network. Rather, the spanning tree will treat the ring as a single link. Conversely, BPDUs from the Ethernet ring are not transmitted into the Ethernet domain that is implementing the spanning tree, so that the spanning tree is not affected by the control mechanism in place on the Ethernet ring network.

Figure 3:
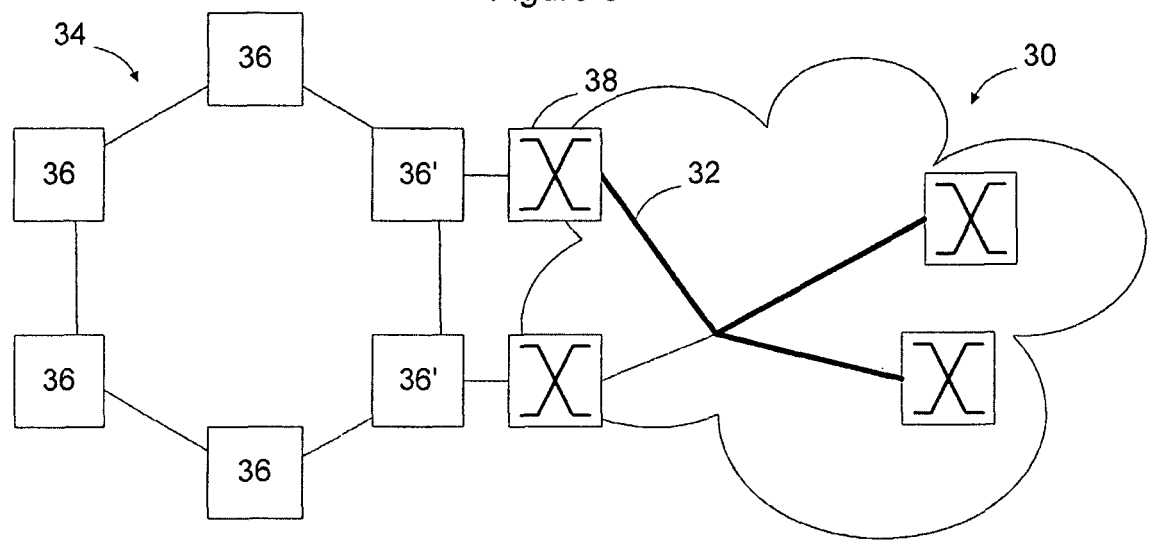
FIG. 3 is a functional block diagram of an Ethernet ring network dual homed to a spanning tree protocol controlled Ethernet network implementing a spanning tree control plane.

FIG. 3 shows a spanning tree protocol controlled Ethernet network 30 implementing a spanning tree 32. The spanning tree protocol controlled Ethernet network 30 may be any type of spanning tree protocol controlled Ethernet network implementing a spanning tree, such as an Ethernet network implemented using one of the 802.1Q, 802.1ad, or 802.1ah protocols. Other Ethernet protocols and extensions to these protocols may be created over time and the invention is not limited to use with an Ethernet network implementing one of these particular Ethernet protocols.

The spanning tree protocol controlled Ethernet network 30 is interconnected with an Ethernet ring network 34 having a plurality of nodes 36. Two of the nodes on the Ethernet ring are also connected to the spanning tree protocol controlled Ethernet network 30. The nodes that interconnect between the Ethernet ring and the spanning tree protocol controlled Ethernet network 30 will be referred to as bridging nodes 36'. Each of the network domains, the Spanning tree protocol controlled Ethernet network 30 and the Ethernet ring network 34, can provide protection switching. Specifically, the Ethernet ring control protocol provides for localized sub-50 ms protection switching within the Ethernet ring, and the spanning tree protocol provides protection switching within the spanning tree protocol controlled Ethernet network.

As shown in FIG. 3, the spanning tree will select particular links for use in the Spanning tree protocol controlled Ethernet network. Since the Ethernet ring control protocol is being used to provide protection switching, it is desirable to decouple the Ethernet ring control protocol from the spanning tree protocol. Specifically, the spanning tree protocol should not affect the port blocking status of any link on the Ethernet ring. To allow this to happen, the nodes on the Ethernet ring will transparently forward all spanning tree BPDUs over the ring. By bridging the BPDUs over the ring, the spanning tree is able to select which of the bridging nodes 36' should be used to transmit data between the domains. This allows the spanning tree protocol to select one or both of the nodes for inclusion in the spanning tree so that traffic within the Spanning tree protocol controlled Ethernet network 30 may be transmitted as normal and without modification to the manner in which the Spanning tree protocol controlled Ethernet network 30 is operating.

Figure 4:
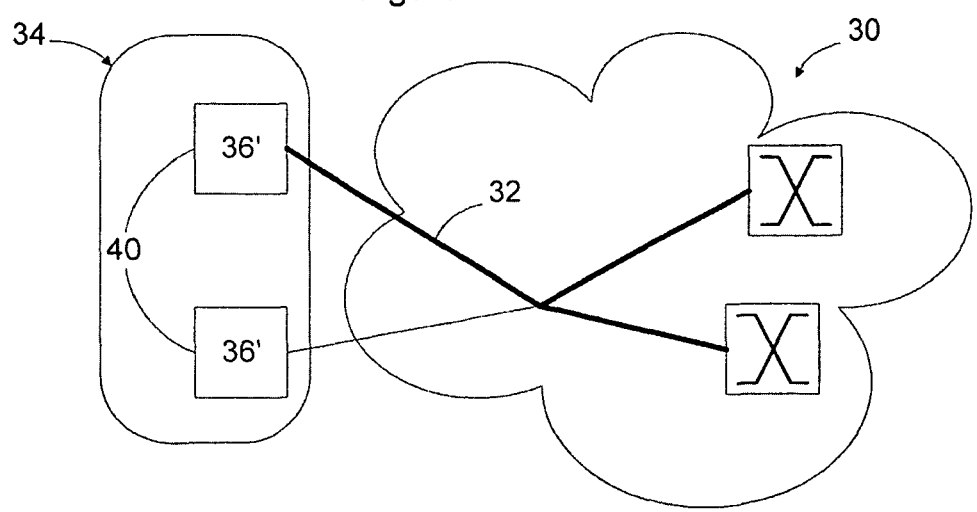
FIG. 4 is a functional block diagram showing the Ethernet ring network of FIG. 3 as viewed by the spanning tree implemented in the Spanning tree protocol controlled Ethernet network.

FIG. 4 illustrates the Spanning tree protocol controlled Ethernet network 30 as viewed by the spanning tree protocol. As shown in FIG. 4, by having the nodes on the Ethernet ring network 34 transparently bridge spanning tree BPDUs, the ring network appears as a link 40 interconnecting the bridging nodes 36 to the spanning tree. By selecting the root node of the spanning tree or assigning link weights of the links or the virtual link implemented via the spanning tree protocol controlled Ethernet network, it is possible to cause the spanning tree to not select the logical link 40 as part of the spanning tree. This allows the data traffic that is intended to stay within the Spanning tree protocol controlled Ethernet network 30 to be kept within the Spanning tree protocol controlled Ethernet network without requiring that traffic to be forwarded across the Ethernet ring network 34.

Bridging BPDUs across the Ethernet ring network allows the spanning tree to select one of the dual homed bridging nodes 36' to transmit data between the two networks. The dual homed bridging nodes 36' may be connected to a single node 38 on the Spanning tree protocol controlled Ethernet network or to two nodes 38 on the Spanning tree protocol controlled Ethernet network. Optionally, a single network element may include ports on each of the networks 30, 34, so that one port of the bridge node 36' is connected to the Spanning tree protocol controlled Ethernet network 30 and another two ports of the bridge node 36' are connected to the Ethernet ring network 34.

Figure 5:
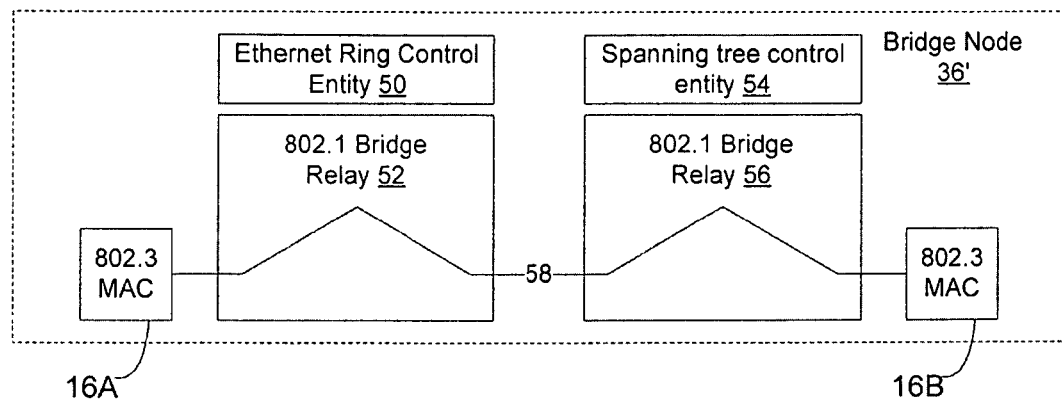
FIG. 5 is a functional block diagram of a bridge node that may be used to interconnect the Ethernet ring network and the Ethernet network implementing a spanning tree control plane.

FIG. 5 is a functional block diagram of a bridge node that may be used to interconnect the Ethernet ring network and the spanning tree protocol controlled Ethernet network. As shown in FIG. 5, the bridge node 36' may include an 802.3 MAC interface 16A connected to a link in the Ethernet Ring network. An Ethernet Ring Control entity 50 associated with a first 802.1 bridge relay 52 is provided to allow the bridge node to forward traffic on the Ethernet ring network and between the Ethernet ring network and the spanning tree controlled Ethernet network. The Ethernet ring control entity 50 also participates in the Ethernet ring control plane and may take action on the Ethernet ring network, such as to generate and transmit Ethernet flush messages on the ring network. The bridge node 36' further includes a spanning tree control entity 54 associated with a second 802.1 bridge relay 56 to allow the bridge node to forward traffic on the spanning tree controlled Ethernet network. A logical link 58 interconnects the two bridge relays to enable data to be forwarded between the two networks. A second 802.3 MAC interface 16B is connected to a link in the spanning tree controlled Ethernet network.

Within the Ethernet ring network, the nodes 36 need to know which of the bridging nodes 36' is on the spanning tree and thus is able to forward traffic into the Spanning tree protocol controlled Ethernet network 30. Generally, the ring nodes 36 will learn MAC addresses as frames are transmitted on the Ethernet ring. Thus, over time the ring nodes 36 will learn how to forward traffic and learn which of the bridging nodes is able to forward traffic from the Ethernet ring network 34 to the Spanning tree protocol controlled Ethernet network 30. However, if the spanning tree changes, the selected bridging node may change as well.

Accordingly, when one of the bridging nodes 36' receives a spanning tree BPDU containing a topology change notification, the bridging node 36' will transmit the BPDUs as data frames over the Ethernet ring network as described above. The bridge node 36' will also generate a control message on the Ethernet ring network to cause each node on the Ethernet ring network to flush its forwarding database. This message will be referred to as a flush only message. By causing the nodes to flush their forwarding databases, the nodes may relearn which of the bridging nodes 36' is to be used to forward traffic to the Spanning tree protocol controlled Ethernet network 30. Thus, when the spanning tree reconfigures itself, the forwarding databases of the nodes on the Ethernet ring network may be flushed so that the nodes can re-learn the correct node to be used according to the new spanning tree configuration.

Figure 6:
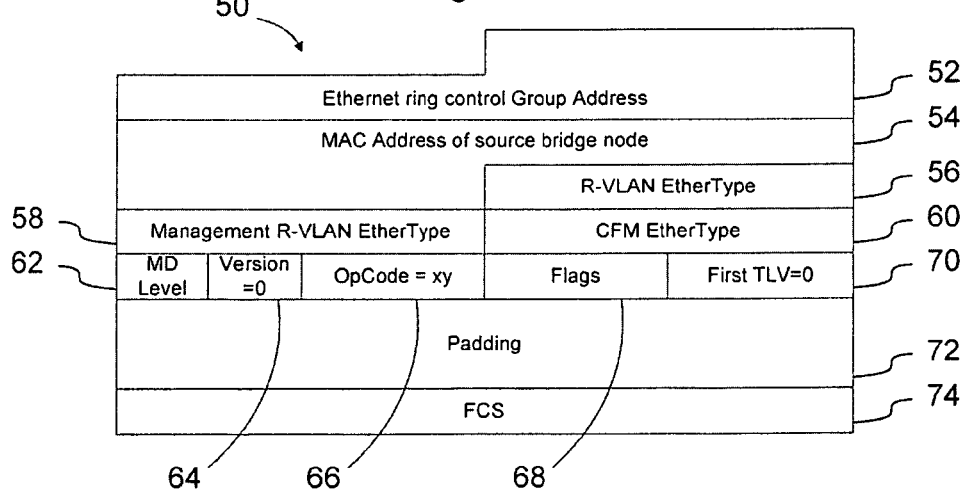
FIG. 6 is a block diagram showing one example of an Ethernet flush only control message that may be used to flush the forwarding databases of the nodes on the Ethernet ring network.

FIG. 6 shows an example of an Ethernet Flush Only message. As shown in FIG. 6, the Ethernet Flush Only message includes a destination address 52 which is set to a group multicast address designated for exchanging control messages on the Ethernet Ring network. Addressing the Ethernet flush only message to the group control address for the Ethernet ring network allows the Ethernet nodes 36 on the network to treat the flush only control message as a normal control message and forward the control message to the control plane.

The Ethernet flush only message also includes the MAC address 54 of the source bridge node that generated the message. The Ethernet flush only message may also include a R-VLAN Ethertype 56, a management R-VLAN Ethertype 58, and a Connectivity Fault Management (CFM) Ethertype 60. These Ethertype values are commonly used and are not unique to the Ethernet flush only message. Similarly, the Ethernet message may include a Maintenance Domain (MD) level 62 and a version 64.

As shown in FIG. 6, the Ethernet flush only message may have an OpCode 66 indicating that it is a flush only message. By setting the value of this field the message may indicate to the control process on the Ethernet ring nodes 36 that the forwarding database is to be flushed so that the Ethernet nodes may re-learn routes on the network. Optionally, a different OpCode or shared OpCode may be used as well.

The Ethernet flush only message may contain one or more flags 68, and a Type Length Value field 70. The message may then include padding 72 to allow the message to be a minimum length, and a Frame Check Sequence 74. Other fields common to an Ethernet frame may also be included, and as the Ethernet standards change over time other fields may likewise be added. Similarly, although the OpCode value was used in this example to designate the frame as a flush only message, other fields of the frame header may also be used to provide this indication.

When a bridge node 36 receives a spanning tree BPDU, it will insert a data R-VLAN value into the spanning tree BPDU to allow the spanning tree BPDU to be identified as a data frame and forwarded across the Ethernet ring network as a data frame. This will allow the nodes 36 on the Ethernet ring network 34 to forward the spanning tree BPDU without forwarding it to their control planes. Thus, the spanning tree in the Spanning tree protocol controlled Ethernet network may remain separate from the control instance in use on the Ethernet ring network, even though the spanning tree BPDUs will be transported across the Ethernet ring network. Thus, the control protocol in the Ethernet ring network 34 is effectively decoupled from the spanning tree protocol. Additionally, since the nodes on the Ethernet ring network do not process the spanning tree BPDU, the internal structure of the ring network is not visible to the spanning tree so that the spanning tree is not able to block links, i.e. ring spans, on the Ethernet ring network. However, since the spanning tree will see both of the bridge nodes and a virtual link between the bridge nodes, the spanning tree may extend across the virtual link and automatically configure itself to accommodate the dual homed connection between the two networks.

Alternatively, the bridge nodes 36' may be programmed such that when a spanning tree BPDU is received, it will be forwarded via bridge relay and not passed to the bridge protocol entity. Spanning tree BPDUs may be identified according to the destination address in use on the Spanning tree protocol controlled Ethernet network for transmission of spanning tree BPDUs. In this option, the bridges on the Ethernet ring network will have forwarding state in their forwarding databases that will allow them to bridge frames addressed to the BPDU multicast address so that such frames are simply tunneled across the Ethernet ring network. The BPDU multicast address, on a standard 802.1 bridge, is a permanent address that is not under management or MAC relay control. Hence, a flush operation will not affect this address and not cause the address to be removed from the bridge's forwarding database in connection with processing of Ethernet Flush Only messages.

For various reasons, the spanning tree may change, which may cause traffic patterns on the spanning tree protocol controlled Ethernet network to change. Where the Ethernet ring network is dual homed to the spanning tree protocol controlled Ethernet network, the change in the spanning tree may affect which of the several nodes is used to transit data between the two networks. Accordingly, the change in the spanning tree may affect traffic patterns in the ring network. Accordingly, enhancements to the Ethernet ring standard specified in ITU-T SG15/Q9 G.8032 would be desirable to support a dual homing solution between an Ethernet ring network and a spanning tree protocol controlled Ethernet network.

The Ethernet ring control protocol should be decoupled from the spanning tree control instance in the spanning tree protocol controlled Ethernet network, so that a change in the spanning tree does not affect the control plane of the Ethernet ring network. However, nodes 36 on the Ethernet ring network 34 that are sourcing traffic that is required to be transmitted on the spanning tree protocol controlled Ethernet network must transmit traffic to the correct bridging node 36' that is supporting the currently active path to the spanning tree protocol controlled Ethernet network. Stated another way, within the Ethernet ring network 34 it is important that the nodes 36 send traffic to the correct bridge node 36' so that the traffic can enter the spanning tree protocol controlled Ethernet network.

Nodes 36 on the Ethernet ring network learn how to reach particular MAC addresses by the familiar process of MAC learning. Accordingly, causing the nodes 36 to flush their forwarding database in the event of a change of the spanning tree that affects the interconnection between the spanning tree protocol controlled Ethernet network and the Ethernet ring network, enables the nodes on the ring network to relearn how MAC addresses are reachable on the network. This allows the change in state in the spanning tree to be propagated into the Ethernet ring network without requiring each of the nodes on the ring to participate in the spanning tree protocol instance.

One way to implement this process is to have the bridge nodes transmit a ring control Failure Indication Flush Only (Eth-FIFO) message when a change in the spanning tree causes the elected bridge to change. Upon receipt of an ETH-FIFO message, the nodes 36 will flush their forwarding database to allow them to re-learn MAC addresses associated with the spanning tree network.

Ethernet flush messages are implemented in the Ethernet ring control protocol and used in that protocol to enable the nodes to flush their forwarding databases upon failure on the ring or upon recovery from a failure on the ring. These same messages may be used to cause the nodes on the ring to flush their forwarding database upon change in the spanning tree that affects the bridge node selection. Thus, the format of the flush message that is used on the ring as part of the control protocol may also be used to accommodate a change in the spanning tree.

An Ethernet message to instruct the nodes on the Ethernet ring to flush their databases may be implemented by causing the Ethernet message to contain an OpCode that instructs the nodes on the Ethernet ring to flush their forwarding databases. Alternatively, the Ethernet message may contain a shared OpCode and other fields within the Ethernet message, such as the status field or request state may contain the instruction to the Ethernet nodes to flush their forwarding databases. The invention is not limited to the particular format of the Ethernet Flush message.

When an E-SPRing node receives an E-SPRing flush indication message, the node will flush (i.e., remove) all dynamic entries from its forwarding database associated with the ring. A node may be on multiple rings and, hence, the flush indication message may be ring specific. Flushing the forwarding database allows the node to relearn MAC addresses on the ring in view of the new configuration. Where multiple logical rings (ringlets) are implemented on a single physical ring, a change in state of the spanning tree may impact all ringlets on the ring or only a subset of the ringlets on the ring. Similarly, if the spanning tree network is running multiple instances of a spanning tree, a change in one spanning tree may only affect a particular ringlet or subset of ringlets on the physical/logical Ethernet ring. Thus, when the Forwarding Database (FDB) is flushed, the entries for all ringlets may be flushed or, alternatively, only the entries for the affected ringlets may be flushed. In another embodiment, when a spanning tree change is detected, only entries associated with a given VID may be flushed from the FDB, or alternatively only selected entries within the VID may be flushed. Thus, depending on the configuration of the ring, different ways of flushing may be optimized to selectively retain information within the FDB that is not affected by the change in configuration of the spanning tree.

In operation, a change in configuration of the spanning tree controlled Ethernet network will be advertised on the network. The spanning tree control entity 54 will process the advertisement and recomputed the spanning tree for the spanning tree controlled Ethernet network. If the change affects the selection of which node 36' is on the spanning tree, then the change in the spanning tree is relevant to the Ethernet ring network. Accordingly, in this instance, the spanning tree control entity 54 will notify the Ethernet ring control entity 50. The spanning tree control entity will generate a flush message and pass the flush message onto the Ethernet ring network via the 802.3 interface 16A to enable the nodes on the ring to relearn routes to that are required to go through the spanning tree protocol controlled Ethernet network.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for interworking an Ethernet ring network with a spanning tree controlled Ethernet network, the method comprising the steps of:

receiving a spanning tree control frame by at least one of two or more bridging nodes concurrently on the Ethernet ring network and part of the Spanning tree protocol controlled Ethernet network in a dual homed fashion;

forwarding the spanning tree control frame over the Ethernet ring network;

the information in the header of the spanning tree control frame is being arranged such that nodes on the Ethernet ring network will forward the spanning tree control frame as a data frame without processing the data frame as a control frame to enable the Ethernet ring to appear as a single link to the spanning tree controlled Ethernet network;

wherein the step of forwarding the spanning tree control frame across the Ethernet ring network causes the Ethernet ring network to appear as a logical link to the spanning tree control instance in the spanning tree protocol controlled Ethernet network; and assigning a high cost to the logical link to prevent traffic intended to remain within the spanning tree protocol controlled Ethernet network from transiting the Ethernet ring network.

2. The method of claim 1, further comprising receiving an Ethernet ring control frame by at least one of the two or more bridging nodes, and not forwarding the Ethernet ring control frame onto the spanning tree controlled Ethernet network.

3. The method of claim 1, wherein the step of forwarding the spanning tree control frame comprises encapsulating the spanning tree control frame for transportation on the Ethernet ring network.

4. The method of claim 1, wherein the step of forwarding the spanning tree control frame comprises tunneling the spanning tree control frame across the Ethernet ring network.

5. The method of claim 1, further comprising electing one of the two or more bridging nodes to be on the spanning tree to interconnect the spanning tree protocol controlled Ethernet network with the Ethernet ring network.

6. The method of claim 5, further comprising the step of electing a different one of the two or more bridging nodes to be on the spanning tree to interconnect the spanning tree protocol controlled Ethernet network with the Ethernet ring network.

7. The method of claim 6, further comprising transmitting a message on to the ring network to cause nodes on the ring network to flush entries from their forwarding databases in connection with the step of electing the different one of the two or more bridging nodes to enable the nodes on the ring network to re-learn MAC addresses associated with the spanning tree protocol controlled Ethernet network.

8. A network, comprising:

a first set of Ethernet nodes arranged in a closed loop and running at least one Ethernet ring control protocol instance;

a second set of Ethernet nodes arranged in a mesh configuration and running at least one spanning tree control protocol instance;

the first set of Ethernet nodes and the second set of Ethernet nodes being interconnected by at least two bridging nodes that are part of both the first set of Ethernet nodes and the second set of Ethernet nodes in a dual homed fashion, each bridging node participating in both the Ethernet ring control protocol and the spanning tree control protocol, a node of the second set of Ethernet nodes transmitting a spanning tree control frame to a bridging node, the first set of Ethernet nodes forwarding the spanning tree control frame without processing the spanning tree control frame as a control frame to enable the first set of Ethernet nodes to appear as a single link to the second set of Ethernet nodes;

wherein the at least two bridging nodes will encapsulate spanning tree control frames before forwarding the spanning tree control frames to the first set of Ethernet nodes, wherein the first set of Ethernet nodes forms an Ethernet ring network, and wherein the at least two bridging nodes will tunnel the spanning tree control frame across the Ethernet ring network, wherein the Ethernet ring network appears as a logical link to the spanning tree protocol control instance, and wherein the logical link is assigned a high cost in the spanning tree protocol control instance to prevent traffic that is intended to be transmitted between nodes of the second set of Ethernet nodes from transiting the Ethernet ring network.

9. The network of claim 8, wherein the first set of Ethernet nodes will forward spanning tree control frames as data frames without processing them as Ethernet ring control frames.

10. The network of claim 8, wherein the at least two bridging nodes will not forward Ethernet ring control frames to the second set of Ethernet nodes.

11. The network of claim 8, wherein the spanning tree protocol control instance elects one of the two or more bridging nodes to be on the spanning tree to forward traffic between the first set of Ethernet nodes and the and the second set of Ethernet nodes.

12. The network of claim 8, wherein first set of Ethernet nodes will flush entries from their forwarding databases to enable the first set of Ethernet nodes to re-learn MAC addresses associated with the spanning tree protocol controlled Ethernet network whenever the spanning tree protocol control instance elects a new one of the two or more bridging nodes to be on the spanning tree.

* * * * *